(12) United States Patent
Dong et al.

(10) Patent No.: US 6,924,350 B2
(45) Date of Patent: Aug. 2, 2005

(54) METHOD OF SEPARATING A POLYMER FROM A SOLVENT

(75) Inventors: Jiawen Dong, Rexford, NY (US); Mark H. Giammattei, Selkirk, NY (US); Norberto Silvi, Clifton Park, NY (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 10/648,542

(22) Filed: Aug. 26, 2003

(65) Prior Publication Data

US 2005/0049394 A1 Mar. 3, 2005

(51) Int. Cl.[7] ................................................. C08F 6/10
(52) U.S. Cl. ...................... 528/481; 528/499; 528/500; 528/501; 528/203; 525/390
(58) Field of Search ................. 528/481, 499, 528/501, 500, 203; 525/390

(56) References Cited

U.S. PATENT DOCUMENTS

| | | |
|---|---|---|
| 3,306,874 A | 2/1967 | Hay |
| 3,306,875 A | 2/1967 | Hay |
| 3,365,422 A | 1/1968 | Van Dort |
| 3,383,435 A | 5/1968 | Cizek |
| 3,451,462 A | 6/1969 | Szabo et al. |
| 3,535,737 A | 10/1970 | Hendry |
| 3,917,507 A | 2/1971 | Siddmore |
| 3,639,656 A | 2/1972 | Bennett et al. |
| 3,642,699 A | 2/1972 | Cooper et al. |
| 3,661,848 A | 5/1972 | Copper et al. |
| 3,733,299 A | 5/1973 | Cooper et al. |
| 3,838,102 A | 9/1974 | Bennett et al. |
| 3,962,181 A | 6/1976 | Sakauchi et al. |
| 3,963,558 A | 6/1976 | Skidmore |
| 4,054,553 A | 10/1977 | Olander |
| 4,083,828 A | 4/1978 | Olander |
| 4,092,294 A | 5/1978 | Bennett, Jr. et al. |
| 4,110,843 A | 8/1978 | Skidmore |
| 4,117,548 A | 9/1978 | Craig |
| 4,161,470 A | 7/1979 | Calundann |
| 4,198,265 A | 4/1980 | Johnson |
| 4,369,278 A * | 1/1983 | Kasahara et al. ........... 524/147 |
| 4,423,960 A | 1/1984 | Anders |
| 4,511,535 A | 4/1985 | Schmidt et al. |
| 4,664,972 A | 5/1987 | Connolly |
| 4,686,279 A | 8/1987 | Nagtzaam et al. |
| 4,808,262 A | 2/1989 | Aneja et al. |
| 4,831,115 A * | 5/1989 | Golba et al. ................. 528/481 |
| 4,877,390 A | 10/1989 | Ocker et al. |
| 4,902,455 A | 2/1990 | Wobbe |
| 4,992,222 A | 2/1991 | Banevicius et al. |
| 4,994,217 A | 2/1991 | Banevicius et al. |
| 5,017,655 A | 5/1991 | Kase et al. |
| 5,102,591 A | 4/1992 | Hasson et al. |
| 5,204,410 A | 4/1993 | Banevicius et al. |
| 5,250,486 A | 10/1993 | Shaffer |
| 5,283,021 A | 2/1994 | Shih |
| 5,324,795 A | 6/1994 | Suenaga |
| 5,338,112 A | 8/1994 | Boden et al. |
| 5,804,111 A | 9/1998 | Kobayashi et al. |
| 6,024,479 A | 2/2000 | Haring |
| 6,100,366 A | 8/2000 | Nakata et al. |
| 6,365,710 B1 | 4/2002 | Wang et al. |
| 6,407,200 B1 | 6/2002 | Singh et al. |
| 6,437,084 B1 | 8/2002 | Birsak et al. |
| 6,444,779 B1 | 9/2002 | Singh et al. |
| 6,469,128 B1 | 10/2002 | Guo et al. |
| 2001/0000520 A1 | 4/2001 | Braat et al. |
| 2002/0055608 A1 | 5/2002 | Braat et al. |
| 2002/0062054 A1 | 5/2002 | Cistone et al. |
| 2003/0067089 A1 | 4/2003 | Wang et al. |
| 2003/0232957 A1 | 12/2003 | Silvi et al. ..................... 528/86 |
| 2003/0236384 A1 | 12/2003 | Silvi et al. |

FOREIGN PATENT DOCUMENTS

| | | |
|---|---|---|
| CA | 1063761 | 10/1971 |
| EP | 0 102 122 | 8/1983 |
| EP | 0 770 637 | 10/1996 |
| EP | 1 167 419 | 6/2001 |
| EP | 1 167 420 | 6/2001 |
| EP | 1 167 421 | 6/2001 |
| GB | 1213467 | 11/1970 |
| WO | WO 02/31033 | 4/2002 |
| WO | WO 03/106149 A1 | 12/2003 |

OTHER PUBLICATIONS

Jp 11268098. Publication Date Oct. 5,1999. Abstract Only.
JP58147332. Publication Date Sep. 2, 1983. Abstract Only.
JP6093014. Publication Date Apr. 5, 1994. Abstract Only.
Bash, et al. "Analyzing Devolatilization Extruders for Residuals Optimization" Antec 96 pp. 356–359.
International Search Report; International Application No: PCT/US2004/022194; International Filing Date Aug. 7, 2004.
European Search Report; European Application No: 04255152.3–2109–; Mailing Date Sep. 12, 2004; 3 pages.

* cited by examiner

Primary Examiner—James J. Seidleck
Assistant Examiner—Irina S. Zemel

(57) ABSTRACT

A method of separating a polymer-solvent mixture is described wherein a polymer-solvent mixture is heated prior to its introduction into an extruder comprising as upstream vent and/or a side feeder vent to allow flash evaporation of the solvent, and downstream vents for removal of remaining solvent. The one-step method is highly efficient having very high throughput rates while at the same time providing a polymer product containing low levels of residual solvent.

47 Claims, 2 Drawing Sheets

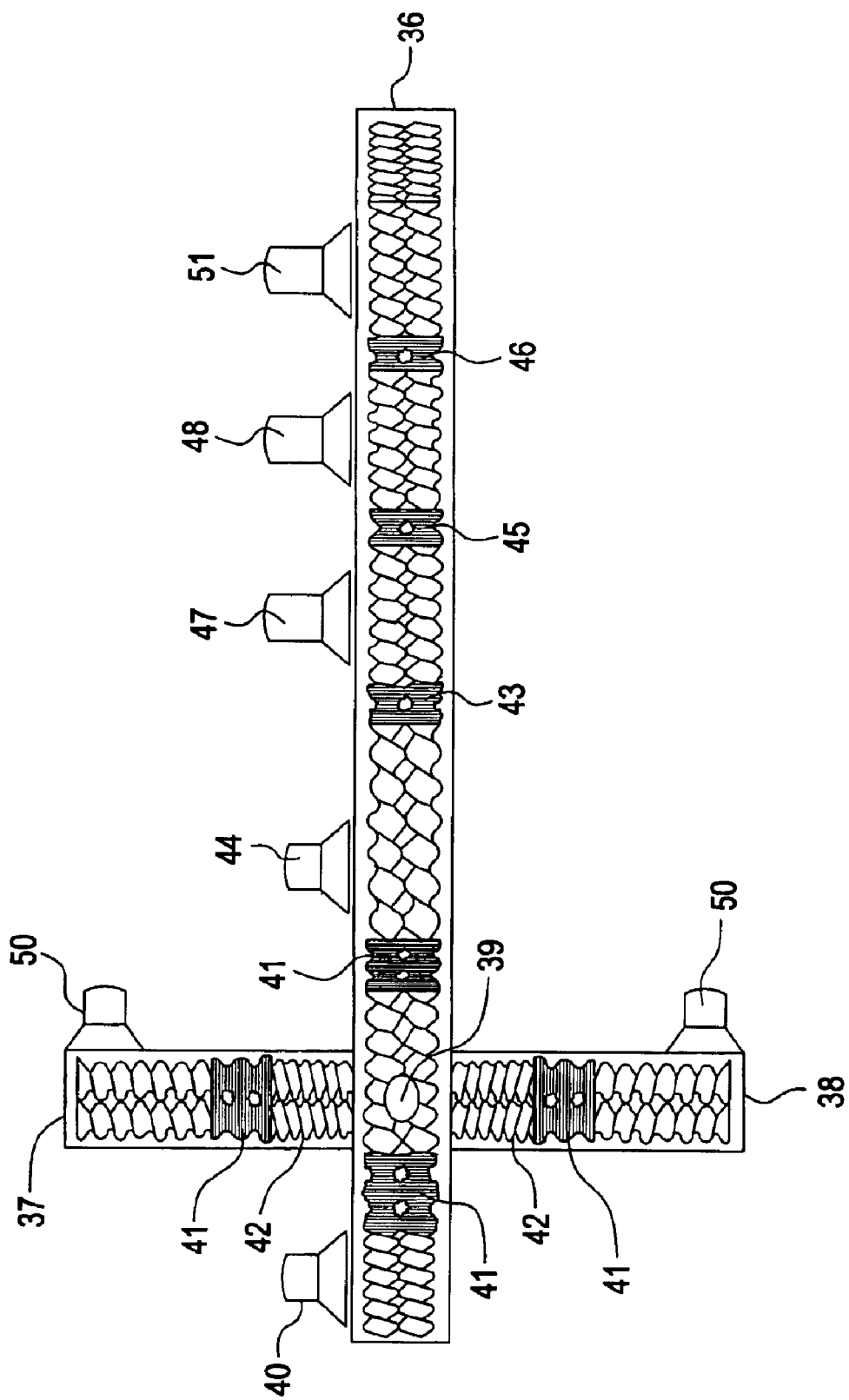

US 6,924,350 B2

METHOD OF SEPARATING A POLYMER FROM A SOLVENT

BACKGROUND OF THE INVENTION

The preparation of polymeric materials is frequently carried out in a solvent from which the polymer product must be separated prior to molding, storage, or other such applications. This is the case in the manufacture of poly(arylene ether), which is typically prepared by the oxidative coupling of at least one monohydroxyaromatic compound in the presence of a catalyst system and solvent. Many other polymers are similarly prepared in solution and require a solvent removal step in order to isolate the polymer product, the polymers being illustrated by interfacially-prepared polycarbonates, polysulfones, interfacially-prepared polycarbonate esters, and the like. The solvent may be used to provide for thorough mixing of reactants and reducing the viscosity of the reaction mixture to provide for uniform heat transfer during the polymerization reaction itself. The solvent may further facilitate product purification by enabling the polymer product to be treated with water, aqueous acids and bases, and drying agents prior to solvent removal. Additionally, because a polymer solution is typically much less viscous than a molten polymer, the polymer solution is generally more easily filtered than the molten polymer.

Due to the pervasive use of solvent solutions in the manufacture or processing of polymeric material, there remains a need in the art to provide a convenient and cost-effective method and system to isolate a polymer from a polymer-solvent mixture.

BRIEF SUMMARY OF THE INVENTION

In one aspect, the present invention provides a method for separating a polymer from a solvent comprising introducing a superheated polymer-solvent mixture to an extruder, wherein the extruder comprises an upstream vent and a downstream vent; removing solvent from the superheated polymer-solvent mixture via the upstream vent and the downstream vent; and isolating a polymer product from the superheated polymer-solvent mixture; wherein the polymer-solvent mixture comprises a polymer and a solvent, wherein the amount of polymer in the polymer-solvent mixture is less than or equal to about 75 weight percent based on the total weight of polymer and solvent, and wherein the polymer is a poly(arylene ether).

In an additional embodiment, a method for separating a polymer from a solvent comprises introducing a superheated polymer-solvent mixture via a pressure control valve located on an extruder or on a side feeder attached to the extruder, wherein the extruder comprises an upstream vent and a downstream vent, wherein the side feeder comprises a side feeder vent, and wherein the pressure control valve is attached to the extruder or positioned between the extruder and the side feeder vent; removing solvent from the superheated polymer-solvent mixture via the upstream vent, the downstream vent, and the side feeder vent; and isolating a polymer product from the polymer solvent mixture; wherein the polymer-solvent mixture comprises a polymer and a solvent, and wherein the polymer comprises a poly(arylene ether).

BRIEF DESCRIPTION OF DRAWINGS

FIG. 2 illustrates another embodiment comprising two side feeders each equipped with a kneading block and vent.

DETAILED DESCRIPTION OF THE INVENTION

Figure 1:
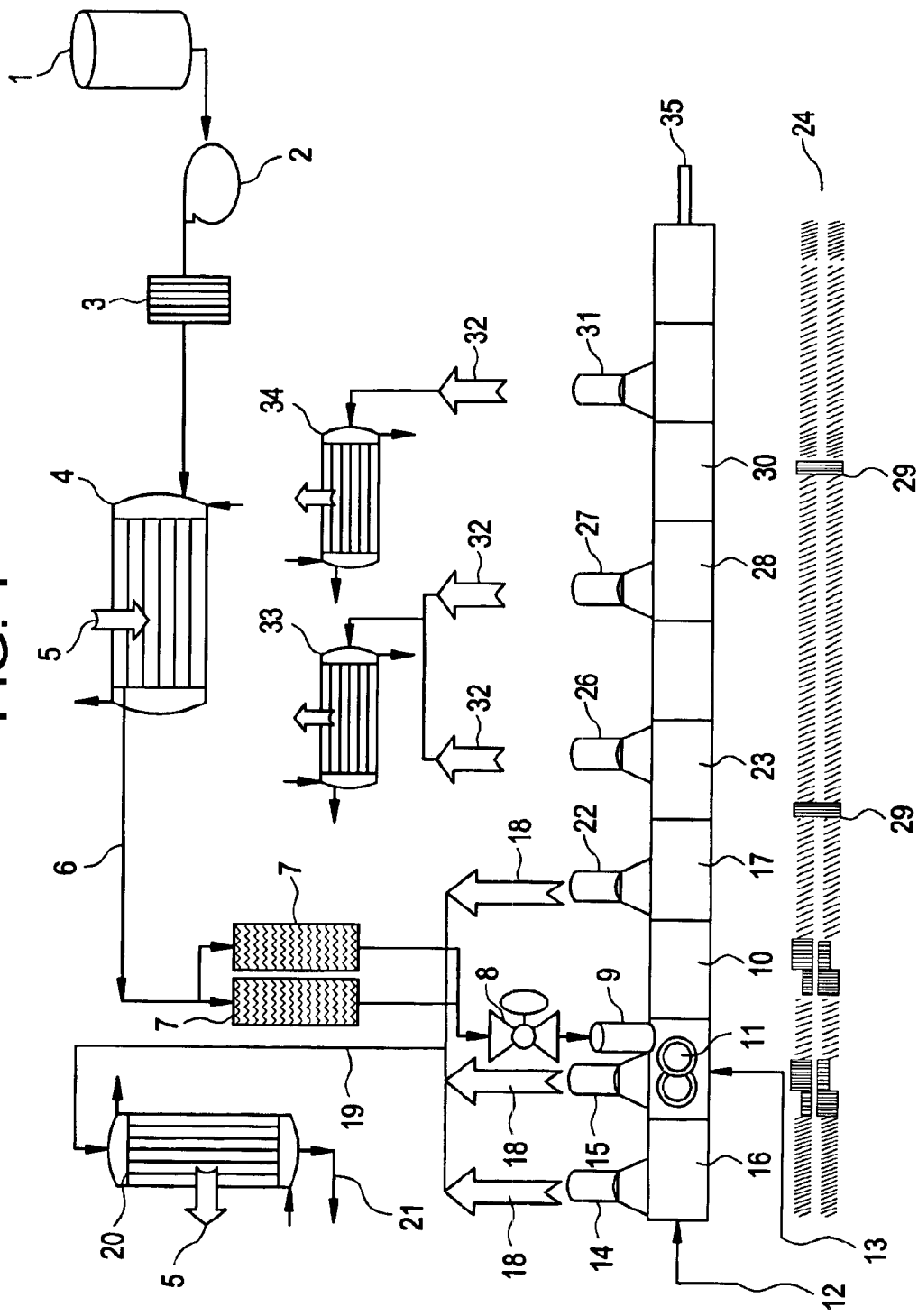
FIG. 1 illustrates one embodiment of a system for separating a polymer-solvent mixture, the system comprising a side feeder with a vent and a twin-screw extruder having one upstream vents and four downstream vents.

Disclosed herein are methods of separating polymer-solvent mixtures into their polymer and solvent components. Also disclosed are systems for effecting the separation of polymer-solvent mixtures. Finally, a method of preparing a polymer product comprising uniformly dispersed filler is disclosed.

The singular forms "a," "an," and "the" include plural referents unless the context clearly dictates otherwise.

"Optional" or "optionally" means that the subsequently described event or circumstance may or may not occur, and that the description includes instances where the event occurs and instances where it does not.

As used herein, the term "substantially all" means 95 percent or more.

As used herein, a polymer "substantially free of solvent" contains less than about 1000 parts per million solvent.

As used herein, the term "solvent" can refer to a single solvent or a mixture of solvents.

The present method relates to separating a polymer from a solvent. Typically polymer-solvent mixtures are solutions which comprise one or more polymers dissolved in one or more solvents. Alternatively, a polymer-solvent mixture may be one or more solvents dissolved in one or more polymers, for example, in a polyphenylene ether-polystyrene blend containing ortho-dichlorobenzene (ODCB).

As noted, a method for separating polymer-solvent mixtures and an apparatus, herein referred to as a system, for accomplishing the same is disclosed. In an exemplary embodiment, the polymer-solvent mixture may be fed into a vented extruder configured to have sufficient volume to permit efficient flash evaporation of solvent from the polymer-solvent mixture, for even very dilute solutions. Preferably the polymer-solvent mixture is heated prior to being feed into the extruder. Heating vessels are suitable for holding the polymer-solvent mixture prior to its introduction into the extruder. The heated polymer-solvent mixture may further be heated by means of a heat exchanger or exchangers. Pumps such as gear pumps may be used to transfer the polymer-solvent mixture through one or more heat exchangers.

The feed inlet through which the polymer-solvent mixture is fed to the feed zone of the extruder may be in close proximity to a nearby vent. The extruder vent upstream of the feed inlet, which is used to effect the bulk of the solvent removal, is herein described as an upstream vent. The upstream vent may be operated at atmospheric or subatmospheric pressure. The extruder, the feed inlet, and the upstream vent are configured to provide the volume needed to permit efficient flash evaporation of solvent from the polymer-solvent mixture. A vent located downstream of the feed port of the extruder is typically run at atmospheric pressure, but preferably at subatmospheric pressure and is described herein as a downstream vent.

The extruder may further comprise a side feeder equipped with a side feeder vent which provides for added volume and serves to trap and return polymer particles entrained by the escaping solvent vapors. The upstream vent nearby the feed inlet and the side feeder vent may be operated at atmospheric or subatmospheric pressure. The downstream vent completes the solvent removal process to provide a polymer product substantially free of solvent.

According to one embodiment, the polymer-solvent mixture is first heated under pressure to produce a superheated polymer-solvent mixture, wherein the temperature of the superheated mixture is greater than the boiling point of the solvent at atmospheric pressure. Typically, the temperature of the superheated polymer-solvent mixture will be about 2° C. to about 200° C. higher than the boiling point of the solvent at atmospheric pressure. Within this range, a temperature of less than or equal to about 150° C. can be employed, with less than or equal to about 100° C. preferred. Also preferred within this range is a temperature of greater than or equal to about 10° C., with greater than or equal to about 50° C. more preferred. In instances where there are multiple solvents present, the polymer-solvent mixture is superheated with respect to at least one of the solvent components. Where the polymer-solvent mixture contains significant amounts of both high and low boiling solvents, it is sometimes advantageous to superheat the polymer-solvent mixture with respect to all solvents present (i.e., above the boiling point at atmospheric pressure of the highest boiling solvent). Superheating of the polymer-solvent mixture may be achieved by heating the mixture under pressure.

Superheating may be described as the temperature a condensable gas is above its boiling point at its current pressure. The degree of superheat, $(P_1^V - P_t)$, to characterize superheating, may be defined as the difference between the equilibrium pressure of the solvent in the vapor phase $(P_1^V)$ and the total pressure in the space of the extruder where the devolatilization process takes place $(P_t)$ as a positive value. In another embodiment, the flash separation of the solvent from the polymer-solvent mixture may be accomplished by applying vacuum to the heated mixture so the surrounding pressure is lower than the vapor pressure of the solvent in the mixture. This method is also described herein as superheating as the degree of superheat $(P_1^{V-P}{}_t)$ is a positive value. A polymer-solvent mixture that is kept at a temperature below the boiling point of the solvent at atmospheric pressure can be in a superheated state as long as the surrounding pressure is lower than the vapor pressure of the solvent at the temperature of the mixture.

When the polymer-solvent mixture is pressurized, the system may comprise a pressure control valve downstream of the heat exchanger, if used, or downstream of the feed tank. The pressure control valve preferably has a cracking pressure higher than atmospheric pressure. The cracking pressure of the pressure control valve may be set electronically or manually and is typically maintained at from about 1 pounds per square inch (psi) (0.07 kgf/cm²) to about 350 psi (25 kgf/cm²) above atmospheric pressure. Within this range, a cracking pressure of less than or equal to about 100 psi (7.0 kgf/cm²) can be employed, with less than or equal to about 50 psi (3.5 kgf/cm²) above atmospheric pressure preferred. Also preferred within this range is a cracking pressure of greater than or equal to about 5 psi (0.35 kgf/cm²), with greater than or equal to about 10 psi (0.7 kgf/cm²) above atmospheric pressure more preferred. The back pressure generated by the pressure control valve is typically controlled by increasing or decreasing the cross sectional area of the valve opening. Typically, the degree to which the valve is open is expressed as percent (%) open, meaning the cross sectional area of valve opening actually being used relative to the cross sectional area of the valve when fully opened. The pressure control valve prevents evaporation of the solvent as it is heated above its boiling point. Typically, the pressure control valve is attached (plumbed) directly to an extruder and serves as the feed inlet of the extruder. A suitable pressure control valve includes a RESEARCH® Control Valve, manufactured by BadgerMeter, Inc.

As mentioned previously, the extruder may comprise a side feeder comprising a vent to aid in the removal of solvent from the polymer-solvent mixture. The extruder in combination with the side feeder is equipped with one or more vents in close proximity to the extruder feed inlet, such as a pressure control valve. The side feeder is typically positioned in close proximity to the feed inlet through which the polymer-solvent mixture is introduced into the extruder, preferably upstream from the feed inlet. For example, FIG. 2 illustrates an extruder (36) comprising two side feeders (37) and (38). Feed inlet (39) is shown in close proximity to the side feeders (37) and (38). It has been found advantageous that the side feeder comprises a feeder vent operated at about atmospheric pressure or subatmospheric pressure. Alternatively, a side feeder feed inlet may be attached to the side feeder itself in which instance the side feeder feed inlet is attached to the side feeder at a position between the point of attachment of the side feeder to the extruder and the side feeder vent. In yet another alternative, the polymer-solvent mixture may be introduced through feed inlets which may be attached to the side feeder, the extruder, or to both extruder and side feeder.

Typically, the side feeder used according to the method is short, having a length to diameter ratio (L/D) of about 20 or less, preferably about 12 or less. The side feeder is typically not heated and functions to provide additional cross sectional area within the feed zone of the extruder thereby allowing higher throughput of the solvent-polymer mixture. The side feeder may be of the single-screw or the twin-screw type. Typically, the twin-screw type side feeder is preferred. The screw elements of the side feeder are configured to convey polymer (which is deposited in the side feeder as the solvent rapidly evaporates) back to the main channel of the extruder. Typically, the side feeder is equipped with at least one vent located near the end of the side feeder most distant from the point of attachment of the side feeder to the extruder. In instances in which a pressure control valve is attached to the side feeder it is preferably attached between the side feeder vent and the point of attachment of the side feeder to the extruder.

As mentioned, the side feeder screw elements are conveying elements which serve to transport deposited polymer into the extruder. In one embodiment the side feeder screw elements comprise a kneading element in addition to the conveying element. Side feeders comprising kneading screw elements are especially useful in instances in which the evaporating solvent has a tendency to entrain polymer particles in a direction opposite to that provided by the conveying action of the side feeder screw elements and out through the vent of the side feeder. The extruder can similarly comprise a kneading screw element between the point of introduction of the polymer-solvent mixture and the upstream vent. As in the side feeder, the kneading extruder screw elements act as mechanical filters to intercept polymer particles being entrained by the solvent vapor moving toward the vents.

The extruder used in the method and system may comprise any number of barrels, type of screw elements, etc. as long as it is configured to provide sufficient volume for flash evaporation of the solvent as well as the downstream devolatilization of remaining solvent. Exemplary extruders include a twin-screw counter-rotating extruder, a twin-screw co-rotating extruder, a single-screw extruder, or a single-screw reciprocating extruder. A preferred extruder is the co-rotating, intermeshing (i.e. self wiping) twin-screw extruder.

In one embodiment, the extruder preferably has a set barrel temperature greater than 190° C., preferably greater than or equal to about 200° C. In one embodiment the extruder comprises heated zones. In one embodiment, the heated zones of the extruder are operated at one or more temperatures of 190° C. to about 400° C. The expression wherein the extruder is operated at a temperature of 190° C. to about 400° C. refers to the heated zones of the extruder, it being understood that the extruder may comprise both heated and unheated zones. Within this embodiment, the temperature of the heated zones may be greater than or equal to about 200° C., preferably greater than or equal to about 250° C., and even more preferably greater than or equal to about 300° C.

In general, as the feed rate of the polymer-solvent mixture is increased a corresponding increase in the screw speed must be made in order to accommodate the additional material being fed to the extruder. Moreover, the screw speed determines the residence time of whatever material is being fed to the extruder, here a polymer-solvent mixture. Thus, the screw speed and feed rate are typically interdependent. It is useful to characterize this relationship between feed rate and screw speed as a ratio. Typically the extruder is operated such that the ratio of starting material introduced into the extruder in kilograms per hour (kg/hr) to the screw speed expressed in revolutions per minute (rpm) falls about 0.0045 to about 45, preferably about 0.01 to about 0.45. For example, the ratio of feed rate to screw speed where the polymer-solvent mixture is being introduced into the extruder at 400 kilograms per hour into an extruder being operated at 400 rpm is 1. The maximum and minimum feed rates and extruder screw speeds are determined by, among other factors, the size of the extruder, the general rule being the larger the extruder the higher the maximum and minimum feed rates. In one embodiment the extruder operation is characterized by a ratio of a feed rate in kilograms per hour to an extruder screw speed in revolutions per minute, the ratio being between about 0.0045 and about 45. In an alternate embodiment the extruder operation is characterized by a ratio of a feed rate in kilograms per hour to an extruder screw speed in revolutions per minute, the ratio being between about 0.01 and about 0.45.

The system may, optionally comprise a condensing system to collect the solvent removed by the upstream vent, downstream vent, and/or side feeder vent. The vents may be connected to a solvent removal and recovery manifold comprising solvent vapor removal lines, a condenser and a liquid solvent receiving vessel. Any solvent collection system known in the art may be used to effect the solvent recovery via the vents.

In one embodiment the superheated polymer-solvent mixture passes through the pressure control valve into the feed zone of the extruder, which due to the presence of the aforementioned vents (upstream extruder vent and/or side feeder vent) may be at atmospheric pressure. The solvent present in the superheated polymer-solvent mixture undergoes sudden and rapid evaporation thereby effecting at least partial separation of the polymer and solvent, the solvent vapors emerging through the upstream vents. Additionally, the extruder is equipped with at least one downstream vent operated at subatmospheric pressure, which serves to remove solvent not removed through the upstream vent and/or side feeder vent. One downstream vent may be used, but preferably at least two downstream vents are used. Generally, from about 50 to about 99 percent, preferably from about 90 to about 97 percent of the solvent present in the initial polymer-solvent mixture is removed through the upstream vent and/or side feeder vent and a substantial portion of any solvent remaining is removed through the downstream vent operated at subatmospheric pressure.

The vent operated at about atmospheric pressure, whether it is an upstream vent or a side feeder vent, is operated at the pressure of the surroundings (in the absence of an applied vacuum), typically about 750 millimeters of mercury (mm of Hg) or greater.

The vent operated at subatmospheric pressure, whether it is an upstream vent, side feeder vent, or downstream vent, may be maintained at less than or equal to about 750 millimeters of mercury (mm of Hg), preferably about 25 to about 750 mm Hg as measured by a vacuum gauge. Within this range, the vent may be operated at greater than or equal to about 100 mm, preferably greater than or equal to about 250 mm and even more preferably greater than or equal to about 350 mm of mercury of vacuum. Also within this range the vents may be operated at less than or equal to about 600 mm, preferably less than or equal to about 500 mm, and more preferably less than or equal to about 400 mm of mercury of vacuum.

In one embodiment, the upstream vent and side feeder vent surrounding the feed inlet of the extruder may be operated at subatmospheric pressure. In this embodiment, the pressure at the upstream vent and side feeder vent are selected and monitored during processing to prevent excessive foaming of the mixture that may result in clogging of the vents, side feeder and/or the condensing system downstream of the extruder.

In one embodiment the polymer-solvent mixture is introduced into an evaporator, a distillation apparatus, or a second extruder to concentrate the polymer-solvent mixture prior to its introduction to the extruder. The evaporator, distillation apparatus, or second extruder is preferably upstream from the extruder and in direct communication with the extruder via a pressure control valve attached directly to the extruder.

In one embodiment the superheated polymer-solvent mixture is introduced through multiple pressure control valves located on the extruder and the side feeder. A system comprising two side feeders and two pressure control valves, the first of the pressure control valves communicating directly with the feed zone of the extruder (i.e. attached directly to the extruder), and the second of the pressure control valves being attached to one of the side feeders, the second of the pressure control valves being said to communicate with the extruder via the side feeder. Alternatively, it is possible to have a system in which there is no pressure control valve in direct communication with the extruder, having instead multiple side feeders each of which is equipped with at least one pressure control valve.

The polymer-solvent mixture that is introduced into the extruder comprises a solvent and a polymer, wherein the amount of polymer is less than or equal to about 99 weight percent based on the total of polymer and solvent. Within this range the amount of polymer may be less than or equal to about 75 weight percent, with less than or equal to about 60 more preferred, and less than or equal to about 50 weight percent based on the total of polymer and solvent more preferred. Also within this range, the weight percent of polymer may be greater than or equal to about 5, with greater than or equal to about 20 preferred, and greater than or equal to about 40 weight percent based on the total of polymer and solvent more preferred.

Polymer-solvent mixtures comprising less than about 30 percent by weight solvent are at times too viscous to be pumped through a heat exchanger, one of the preferred methods for superheating the polymer-solvent mixtures. In such instances it is possible to superheat the polymer-solvent mixture by other means, for example, heating the polymer-solvent mixture in a extruder, or a helicone mixer, or the like. The polymer-solvent mixture may be superheated by means of a first extruder. The superheated polymer-solvent mixture emerging from the first extruder may be transferred through a pressure control valve into a second devolatilizing extruder comprising a vent operated at subatmospheric pressure, optionally a vent operated at about atmospheric pressure, and a side feeder comprising a vent being operated at atmospheric pressure. In one embodiment, the die face of the first extruder may serve as the pressure control valve, which regulates the flow of superheated polymer-solvent mixture into the second devolatilizing extruder. In this embodiment, the superheated polymer-solvent mixture is introduced directly from the die face of the first extruder into the feed zone of the second devolatilizing extruder. The first extruder may be any single-screw extruder or twin-screw extruder capable of superheating the polymer-solvent mixture.

The polymer product emerges from the extruder as an extrudate, which may be pelletized and dried before further use. In some instances the polymer product, notwithstanding the action of the upstream, downstream, and/or side feeder vents present, may contain an amount of residual solvent which is in excess of a maximum allowable amount which renders the polymer unsuitable for immediate use in a particular application, for example a molding application requiring that the amount of residual solvent be less than about 100 parts per million based on the weight of the polymer product. In such instances it is possible to further reduce the level of residual solvent by subjecting the polymer product to an additional extrusion step. Thus, the extruder into which the polymer-solvent mixture is first introduced may be coupled to a second extruder, the second extruder being equipped with one or more subatmospheric or atmospheric vents for the removal of residual solvent. The second extruder may be closely coupled to the initial extruder thereby avoiding any intermediate isolation and re-melting steps. The use of a second extruder in this manner is especially beneficial during operation at high throughput rates where the residence time of the polymer in the initial extruder is insufficient to achieve the desired low level of residual solvent. The second extruder may be any vented extruder such as a vented twin-screw counter-rotating extruder, a vented twin-screw co-rotating extruder, a vented single-screw extruder, or a vented single-screw reciprocating extruder. The term vented extruder means an extruder possessing at least one vent, the vent being operated at atmospheric pressure or subatmospheric pressure. Where the extruder comprises a plurality of vents, some vents may be operated at atmospheric pressure while others are operated at subatmospheric pressure.

In another preferred embodiment the polymer-solvent mixture is filtered prior to its introduction into the extruder. The polymer-solvent mixture may be filtered prior to and/or after heating or superheating to a temperature greater than the boiling point of the solvent. Filtration of the polymer-solvent mixture may be described as solution filtration.

Suitable solution filtration systems include a sintered-metal filter, a cloth filter, a fiber filter, a paper filter, a metal mesh filter, a pulp filter, a ceramic filter, or the like. The geometry of the filter may be cone, pleated, candle, stack, flat, wraparound, or the like.

The pore size of the solution filtration system filters may be of any size ranging from about 0.01 micrometers to about 100 micrometers, or greater. Within this range, a pore size of less than or equal to about 50 micrometers can be employed, with less than or equal to about 20 micrometers preferred, and less than or equal to about 15 micrometers more preferred. Also preferred within this range is a pore size of greater than or equal to about 0.1 micrometer, with greater than or equal to about 3 micrometers more preferred, and greater than or equal to about 5 micrometers especially preferred.

The polymer-solvent mixture may be gravity filtered, pressure filtered, vacuum filtered, batch filtered, continuously filtered or combinations of the foregoing filtration methods. The filter system can be in-line with the extruder or off-line. A single filter can be used or two or more filters in series or parallel. Additionally, a single filtration step may be used or two or more filtration steps may be used combining different filter media.

A preferred solution filtration system is in direct communication with the extruder via a pressure control valve attached directly to the extruder. A highly preferred solution filtration system is an in-line sintered metal filter having a pore size of about 50 micrometers or less, preferably about 30 micrometers or less, and more preferably about 15 micrometers or less. Particularly useful filters are sintered metal filters exhibiting high tortuosity including the filters commercially available from PALL Corporation.

In yet another embodiment, the extruder includes a melt filtration system at the die end of the extruder. The melt filtration system may be used to filter out any particulates produced during the extrusion process. Suitable systems include filters such as sintered metal filters, metal mesh filters, and the like.

The pore size of the melt filtration filters is chosen to remove the particulates produced during the extrusion process while at the same time allowing maximum filtering efficiency with a minimum of pressure drop and viscous heat dissipation. The pore size of the melt filters can be about 0.1 micrometer to about 50 micrometers. Within this range, a pore size of less than or equal to about 30 micrometers can be employed, with less than or equal to about 20 micrometers preferred, and less than or equal to about 15 micrometers more preferred. Also preferred within this range is a pore size of greater than or equal to about 2 micrometers, with greater than or equal to about 5 micrometers more preferred, and greater than or equal to about 7 micrometers especially preferred.

The polymer-solvent mixture may comprise a wide variety of polymers. Exemplary polymers include polyetherimides, polycarbonates, polycarbonate esters, poly (arylene ether)s, polyamides, polyarylates, polyesters, polysulfones, polyetherketones, polyimides, olefin polymers, polysiloxanes, poly(alkenyl aromatic)s, and blends comprising at least one of the foregoing polymers. In instances where two or more polymers are present in the polymer-solvent mixture, the polymer product may be a polymer blend, such as a blend of a poly(arylene ether) and a poly(alkenyl aromatic). It has been found that the pre-dispersal or pre-dissolution of two or more polymers within the polymer-solvent mixture allows for the efficient and uniform distribution of the polymers in the resulting isolated polymer product matrix.

As used herein, the term polymer includes both high molecular weight polymers, for example bisphenol A polycarbonate having a number average molecular weight $M_n$ of 10,000 atomic mass units (amu) or more, and relatively low molecular weight oligomeric materials, for example bisphenol A polycarbonate having a number average molecular weight of about 800 amu. Typically, the polymer-solvent mixture is a product mixture obtained after a polymerization reaction, or polymer derivatization reaction, conducted in a solvent. For example, the polymer-solvent mixture may be the product of the condensation polymerization of bisphenol A dianhydride (BPADA) with m-phenylenediamine in the presence of phthalic anhydride chainstopper in ODCB, or the polymerization of a bisphenol, such as bisphenol A, with phosgene conducted in a solvent such as methylene chloride. In the first instance, a water soluble catalyst is typically employed in the condensation reaction of BPADA with m-phenylenediamine and phthalic anhydride, and this catalyst can be removed prior to any polymer isolation step. Thus, the product polyetherimide solution in ODCB is washed with water and the aqueous phase is separated to provide a water washed solution of polyetherimide in ODCB. In such an instance; the water washed solution of polyetherimide in ODCB may serve as the polymer-solvent mixture which is separated into polymeric and solvent components using the method described herein. Similarly, in the preparation of bisphenol A polycarbonate by reaction of bisphenol A with phosgene in a methylene chloride-water mixture in the presence of an inorganic acid acceptor such as sodium hydroxide, the reaction mixture upon completion of the polymerization is a two-phase mixture of polycarbonate in methylene chloride and brine. The brine layer is separated and the methylene chloride layer is washed with acid and pure water. The organic layer is then separated from the water layer to provide a water washed solution of bisphenol A polycarbonate in methylene chloride. Here again, the water washed solution of bisphenol A polycarbonate in methylene chloride may serve as the polymer-solvent mixture which is separated into polymeric and solvent components using the method described herein.

Polymer derivatization reactions carried out in solution are frequently employed by chemists wishing to alter the properties of a particular polymeric material. For example, polycarbonate prepared by the melt polymerization of a bisphenol such as bisphenol A with a diaryl carbonate such as diphenyl carbonate may have a significant number of chain terminating hydroxyl groups. It is frequently desirable to convert such hydroxyl groups into other functional groups such as esters by reacting the polycarbonate in solution with an electrophilic reagent such as an acid chloride, for example benzoyl chloride. Here, the polymer is dissolved in a solvent, the reaction with benzoyl chloride and an acid acceptor such as sodium hydroxide is performed and the reaction mixture is then washed to remove water soluble reagents and byproducts to provide a polymer-solvent mixture necessitating solvent removal in order to isolate the derivatized polymer. Such polymer-solvent mixtures may be separated into polymeric and solvent components using the method described herein.

In one embodiment, the polymer-solvent mixture comprises a poly(arylene ether) having structure I

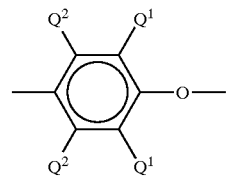

wherein for each structural unit, each $Q^1$ is independently halogen, primary or secondary lower alkyl (e.g., alkyl containing up to 7 carbon atoms), phenyl, haloalkyl, aminoalkyl, hydrocarbonoxy, or halohydrocarbonoxy wherein at least two carbon atoms separate the halogen and oxygen atoms, or the like; and each $Q^2$ is independently hydrogen, halogen, primary or secondary lower alkyl, phenyl, haloalkyl, hydrocarbonoxy, or halohydrocarbonoxy wherein at least two carbon atoms separate the halogen and oxygen atoms, or the like. It will be understood that the term "haloalkyl" includes alkyl groups substituted with one or more halogen atoms, including partially and fully halogenated alkyl groups. Preferably, each $Q^1$ is alkyl or phenyl, especially $C_{1-4}$ alky, and each $Q^2$ is hydrogen or methyl.

Both homopolymer and copolymer poly(arylene ether) are included. The preferred homopolymers are those containing 2,6-dimethylphenylene ether units. Suitable copolymers include random copolymers containing, for example, such units in combination with 2,3,6-trimethyl-1,4-phenylene ether units or copolymers derived from copolymerization of 2,6-dimethylphenol with 2,3,6-trimethylphenol. Also included are poly(arylene ether) containing moieties prepared by grafting vinyl monomers or polymers such as polystyrenes, as well as coupled poly(arylene ether) in which coupling agents such as low molecular weight polycarbonates, quinones, heterocycles and formals undergo reaction in known manner with the hydroxy groups of two poly(arylene ether) chains to produce a higher molecular weight polymer. Poly(arylene ether)s further include combinations comprising at least one of the above.

The poly(arylene ether) generally has a number average molecular weight of about 3,000–40,000 amu and a weight average molecular weight of about 20,000–80,000 amu, as determined by gel permeation chromatography using polystyrene standards. The poly(arylene ether) may have an intrinsic viscosity of about 0.10 to about 0.60 deciliters per gram (dl/g), preferably about 0.29 to about 0.48 dl/g, as measured in chloroform at 25° C. It is also possible to utilize a high intrinsic viscosity poly(arylene ether) and a low intrinsic viscosity poly(arylene ether) in combination. Determining an exact ratio, when two intrinsic viscosities are used, will depend somewhat on the exact intrinsic viscosities of the poly(arylene ether) used and the ultimate physical properties that are desired.

Known processes to prepare poly(arylene ether)s include European patent documents EP 1167421A2; EP1167419A2; and EP1167420A1. Further methods for preparing poly(arylene ether)s are described, for example, in U.S. Pat. Nos. 5,250,486; 5,017,655; 4,092,294; 4,083,828; 4,054,553; 3,962,181; 3,838,102; 3,733,299; 3,661,848; 3,642,699; 3,639,656; 3,365,422; 3,306,875; and 3,306,874.

Based upon the foregoing, it will be apparent to those skilled in the art that the contemplated poly(arylene ether) resin may include any of those poly(arylene ether) resins presently known, irrespective of variations in structural units, ancillary chemical features, or method of preparation.

Suitable poly(arylene ether)s include, but are not limited to poly(2,6-dimethyl-1,4-phenylene ether); poly(2,3,6- trimethyl-1,4-phenylene) ether; poly(2,6-diethyl-1,4-phenylene) ether; poly(2-methyl-6-propyl-1,4-phenylene) ether; poly(2,6-dipropyl-1,4-phenylene) ether; poly(2-ethyl-6-propyl-1,4-phenylene)ether; poly(2,6-dilauryl-1,4-phenylene) ether; poly(2,6-diphenyl-1,4-phenylene) ether, poly(2,6-dimethoxy-1,4 phenylene) ether; poly(2,6-diethoxy-1,4-phenylene) ether; poly(2-methoxy-6-ethoxy-1,4-phenylene) ether; poly(2-ethyl-6-stearyloxy-1,4-phenylene) ether; poly(2,6-dichloro-1,4-phenylene) ether; poly(2-methyl-6-phenyl-1,4-phenylene) ether; poly(2-ethoxy-1,4-phenylene) ether; poly(2-chloro-1,4-phenylene) ether; poly(2,6-dibromo-1,4-phenylene) ether; poly(3-bromo-2,6-dimethyl-1,4-phenylene) ether; or a mixture of the foregoing poly(arylene ether)s.

In another embodiment, the polymer-solvent mixture comprises a poly(arylene ether) and a poly(alkenyl aromatic) resin. The term poly(alkenyl aromatic) resin as used herein includes polymers prepared by methods known in the art including bulk, suspension, and emulsion polymerization, which contain at least 25% by weight of structural units derived from an alkenyl aromatic monomer having the structure II

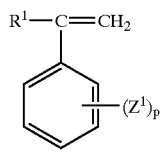

wherein $R^1$ is hydrogen, $C_1$–$C_8$ alkyl, or halogen; $Z^1$ is vinyl, halogen or $C_1$–$C_8$ alkyl; and p is 0 to 5. Preferred alkenyl aromatic monomers include styrene, chlorostyrene, and vinyltoluene. The poly(alkenyl aromatic) resins include homopolymers of an alkenyl aromatic monomer; random copolymers of an alkenyl aromatic monomer, such as styrene, with one or more different monomers such as acrylonitrile, butadiene, alpha-methylstyrene, ethylvinylbenzene, divinylbenzene and maleic anhydride; and rubber-modified poly(alkenyl aromatic) resins comprising blends and/or grafts of a rubber modifier and a homopolymer of an alkenyl aromatic monomer (as described above), wherein the rubber modifier may be a polymerization product of at least one $C_4$–$C_{10}$ nonaromatic diene monomer, such as butadiene or isoprene, and wherein the rubber-modified poly(alkenyl aromatic) resin comprises about 98 to about 70 weight percent of the homopolymer of an alkenyl aromatic monomer and about 2 to about 30 weight percent of the rubber modifier, preferably about 88 to about 94 weight percent of the homopolymer of an alkenyl aromatic monomer and about 6 to about 12 weight percent of the rubber modifier. A preferred poly(alkenyl aromatic) is a homopolymer of the alkenyl aromatic monomer (II) wherein $R^1$ is hydrogen, lower alkyl or halogen; $Z^1$ is vinyl, halogen or lower alkyl; and p is from 0 to 5. A particularly preferred homopolymer of an alkenyl aromatic monomer is the homopolymer derived from styrene (i.e., homopolystyrene). The homopolystyrene preferably comprises at least 99% of its weight, more preferably 100% of its weight, from styrene.

The stereoregularity of the poly(alkenyl aromatic) resin may be atactic or syndiotactic. Highly preferred poly(alkenyl aromatic) resins include atactic and syndiotactic homopolystyrenes. Suitable atactic homopolystyrenes are commercially available as, for example, EB3300 from Chevron, and P1800 from BASF.

The poly(alkenyl aromatic) may have a number average molecular weight of about 20,000–100,000 atomic mass units (amu) and a weight average molecular weight of about 10,000–300,000 amu.

The polymer-solvent mixture may comprise a blend of poly(alkenyl aromatic) resin in an amount of about 99 to about 1 weight percent and poly(arylene ether) resin in an amount of about 1 to about 99 weight percent, based on the total weight of the poly(alkenyl aromatic) and resin poly(arylene ether). Within this range the amount of poly(arylene ether) in the blend may be less than or equal to about 80 weight percent, less than or equal to about 70 weight percent preferred, and less than or equal to about 60 weight percent more preferred. Also preferred within this range is a poly(arylene ether) greater than or equal to about 20 weight percent, greater than or equal to about 30 weight percent preferred, and greater than or equal to about 40 weight percent more preferred. Within this range the amount of poly(alkenyl aromatic) in the blend may be less than or equal to about 80 weight percent, less than or equal to about 70 weight percent preferred, and less than or equal to about 60 weight percent more preferred. Also preferred within this range is a poly(alkenyl aromatic) greater than or equal to about 20 weight percent, greater than or equal to about 30 weight percent preferred, and greater than or equal to about 40 weight percent more preferred.

The poly(arylene ether) of the polymer-solvent mixture may be from any available source or form such as pellet, powder, and the like; or in solution as a direct product feed stream from a reactor or reaction vessel. A solution of poly(alkenyl aromatic) resin and the poly(phenylene ether) may be formed. Alternatively, the poly(alkenyl aromatic) resin may be added to the extruder via a side feeder at a point along the extruder in an additional compounding step.

The application of the method to a polymer-solvent mixture effects the separation of the solvent component from the polymeric component. The polymeric component emerging from the extruder is said to be devolatilized and is frequently referred to as the polymer product. In one embodiment, the polymer product is found to be substantially free of solvent. By substantially free it is meant that the polymer product contains less than 1000 parts per million (ppm) residual solvent based on the weight of the sample tested. In some instances the amount of residual solvent in the polymer product isolated may exceed 1000 ppm. The concentration of solvent in the polymer product correlates with the ratio between the feed rate and the extruder screw speed, with lower ratios (that is lower rates, or higher screw speeds, or both) leading to lower concentrations of solvent in the final product. The concentration of the solvent in the polymer product may be adjusted by adjusting the feed rate and/or the extruder screw speed.

In one embodiment, the method provides a polymer product which is substantially free of solvent and is a poly(arylene ether) having structure I. In an alternate embodiment, the method provides a polymer blend, which is substantially free of solvent. Examples of polymer product blends which are substantially free of solvent include blends containing at least two different polymers selected from the group consisting of polycarbonates, polyetherimides, polysulfones, poly(alkenyl aromatic)s, and poly(arylene ether)s. A particularly preferred blend comprises poly(alkenyl aromatic) and poly(arylene ether).

The polymer-solvent mixtures separated by the method may comprise one or more solvents. These solvents include halogenated aromatic solvents, halogenated aliphatic solvents, non-halogenated aromatic solvents, non-halogenated aliphatic solvents, and mixtures thereof. Halogenated aromatic solvents are illustrated by ortho-dichlorobenzene (ODCB), chlorobenzene and the like. Non-halogenated aromatic solvents are illustrated by toluene, xylene, anisole, and the like. Halogenated aliphatic solvents are illustrated by methylene chloride; chloroform; 1,2-dichloroethane; and the like. Non-halogenated aliphatic solvents are illustrated by ethanol, acetone, ethyl acetate, and the like.

In one embodiment, the method may further comprise a compounding step. An additive, a filler, or an additional polymer may be added to the polymer-solvent mixture via the extruder which further comprises a non-venting side feeder. A non-venting side feeder differs from the side feeder mentioned previously in that the non-venting side feeder does not function to vent solvent vapors from the extruder. Such an embodiment is illustrated by the case in which an additive, such as a flame retardant or an additional polymer, is preferably introduced at a point along the extruder barrel downstream of most or all vents that are present on the extruder barrel for the removal of solvent. The additive so introduced is mixed by the action of the extruder screws with the partially or fully devolatilized polymer and the product emerges from the extruder die face as a compounded polymeric material. When preparing compounded polymeric materials in this manner it is at times advantageous to provide for additional extruder barrels and to adapt the screw elements of the extruder to provide vigorous mixing down stream of the point along the barrel at which the additive is introduced. The extruder may comprise a vent downstream of the non-venting side feeder to remove volatiles still remaining, or that may have been produced by the side feeder addition of the additive, filler, and/or additional polymer to the extruder.

As mentioned above, the additional polymer introduced in the compounding step may include a polyetherimide, a polycarbonate, a polycarbonate ester, a poly(arylene ether), a polyamide, a polyarylate, a polyester, a polysulfone, a polyetherketone, a polyimide, a olefin polymer, a polysiloxane, a poly(alkenyl aromatic), and a combination comprising at least one of the foregoing polymers, and the like.

Non-limiting examples of fillers include silica powder, such as fused silica and crystalline silica; talc; glass fibers; carbon black; conductive fillers; carbon nanotubes; nanoclays; organoclays; a combination comprising at least one of the foregoing fillers; and the like.

The amount of filler present in the polymer can range anywhere of about 0 to about 50 weight percent based on the total weight of the composition, preferably from about 0 to about 20 weight percent thereof.

The additives include, but are not limited to, colorants such as pigments or dyes, UV stabilizers, antioxidants, heat stabilizers, foaming agents, and mold release agents. Where the additive is one or more conventional additives, the product may comprise about 0.0001 to about 10 weight percent of the desired additives, preferably about 0.0001 to about 1 weight percent of the desired additives.

In another embodiment, the polymer-solvent mixture may further comprise at least one filler and/or at least one additive prior to its introduction into the extruder. It has been found that the pre-dispersal of filler into the polymer-solvent mixture allows for the efficient and uniform distribution of the filler in the resulting isolated polymer product matrix. The lower viscosity of the polymer-solvent mixture allows for efficient mixing of the filler and polymer with a minimized usage of energy as compared to compounding the filler and polymer in an extruder or similar device. Accordingly, a one-step process of compounding/isolation/devolatilization is disclosed to provide filled polymer product without the need for the usual remelting and compounding of the polymer and filler after the isolation step has been performed. A further advantage of adding the filler to the polymer-solvent mixture rather than compounding it in an extruder is to minimize the heat history of the polymer.

In one embodiment, the polymer-solvent mixture further comprises a liquid crystalline polymer, such as liquid crystalline polyester and copolyesters. Suitable liquid crystalline polymers are described in U.S. Pat. Nos. 5,324,795; 4,161,470; and 4,664,972.

The fillers and additives that may be dispersed in the polymer-solvent mixture may be any of those listed for the additional compounding step above.

Polymeric materials isolated according to the methods described herein may be transformed into useful articles directly, or may be blended with one or more additional polymers or polymer additives and subjected to injection molding, compression molding, extrusion methods, solution casting methods, and like techniques to provide useful articles. Injection molding is frequently the more preferred method of forming the useful articles.

In one embodiment, a method for separating a polymer from a solvent comprises introducing a superheated polymer-solvent mixture via a pressure control valve located on a barrel of an extruder, wherein the extruder comprises an upstream vent, a downstream vent, and a side feeder, wherein the side feeder comprises a side feeder vent and the upstream vent and the side-feeder vent are operated at about atmospheric pressure and the downstream vent is operated at subatmospheric pressure; removing solvent from the superheated polymer-solvent mixture via the upstream vent, the downstream vent and the side feeder vent; and isolating a polymer product from the polymer solvent mixture; wherein the polymer-solvent mixture comprises a polymer and a solvent.

In one embodiment, a method for separating a polymer from a solvent comprising introducing a superheated polymer-solvent mixture via a pressure control valve located on a side feeder attached to an extruder, wherein the extruder comprises a downstream vent, wherein the side feeder comprises a side feeder vent, and wherein the pressure control valve is located between the extruder and the side feeder vent; removing solvent from the superheated polymer-solvent mixture via the downstream vent and the side feeder vent; and isolating a polymer product from the polymer solvent mixture; wherein the polymer-solvent mixture comprises a polymer and a solvent, and wherein the polymer comprises a poly(arylene ether).

In one embodiment, a system for separating a polymer from a solvent, the system comprising a means for heating a polymer-solvent mixture, preferably to provide a superheated polymer-solvent mixture; an extruder in communication with the means for heating a polymer solvent mixture, the communication being via at least one feed inlet, preferably a pressure control valve through which a polymer-solvent mixture may be introduced into the extruder, the extruder being equipped with at least one upstream vent adapted for operation at atmospheric or subatmospheric pressure, and at least one downstream vent adapted for operation at subatmospheric pressure; and optionally at least one side feeder in communication with the extruder, the side feeder being equipped with at least one vent adapted for operation at atmospheric or subatmospheric pressure and optionally at least one pressure control valve through which the polymer-solvent mixture may be introduced into the extruder via the side feeder. As an example of what is meant by the expressions in communication with or to communicate with, the side feeder is said to be in communication with or to communicate with the extruder because the barrel of the side feeder is understood to intersect the barrel of the extruder allowing for the passage of solvent vapor generated in the extruder barrel outwards along the side feeder barrel out through the vent of the side feeder.

Means for heating a polymer-solvent mixture to provide a heated or superheated polymer-solvent mixture include heated feed tanks, heat exchangers, reaction vessels, all of which may or may not be pressurized, extruders, and the like.

The extruder in communication with the means for heating a polymer solvent mixture may be a twin-screw counter-rotating extruder, a twin-screw co-rotating extruder, a single-screw extruder, or a single-screw reciprocating extruder.

FIGS. 1 and 2 illustrate two exemplary embodiments of the disclosed system and method. FIG. 1 illustrates a system and a method comprising a nitrogen-pressurized, heated feed tank (1) for supplying a polymer-solvent mixture, a gear pump (2) for pumping the mixture though a flow meter (3) and heat exchanger (4). The heat exchanger provides heat (5) to provide a superheated polymer-solvent mixture (6) which is forced by the action of the gear pump through in-line filters (7) to remove particulate impurities from the superheated polymer-solvent mixture which passes through a pressure control valve (8) and a short connecting pipe (9) to the feed zone of a twin-screw extruder (10) having screw design (24). Extruder (10) is equipped with a side feeder (11) and nitrogen gas inlets (12) and (13). Upstream vent (14) and a side feeder vent (15) for removing solvent vapors (18) are located on barrel 1 (16), and the side feeder (11), respectively. The escaping solvent vapors (18) are captured in a solvent vapor manifold (19) connected to a condenser (20) where heat (5) is removed and solvent (21) is recovered. Downstream of barrel 4 (17) the extruder screw elements are configured to provide melt seals (29) in barrel 5 (23) and barrel 8 (30) respectively. Downstream vents (22), (26), (27) and (31) provide for the removal of solvent not removed through the upstream vents. Solvent vapors (18) and (32) are condensed and recovered at condensers (20), (33) and (34). The polymer product (35) emerges from the extruder for pelletization and further use.

FIG. 2 illustrates a portion of the system comprising a twin-screw extruder (36), side feeders (37) and (38), a feed inlet (39) comprising a pressure control valve, upstream vent (40), side feeder vents (50) located on the side feeders, kneading blocks (41) adapted for capturing solid polymer entrained by escaping solvent vapor, side feeder conveying screw elements (42) which provide for the transfer of polymer deposited in the side feeder to the screws of the twin-screw extruder, (43), (45) and (46) screw elements providing melt seals, and downstream vents (44), (47), (48) and (51) providing for removal of additional solvent.

In one embodiment additional precautions may be taken to exclude oxygen from the extruder and from contact with the hot polymer as it emerges from the extruder dieface. Such precautions may assist in preventing discoloration of the polymer product, especially when the polymer product is known to darken or otherwise degrade at high temperature in the presence of oxygen. For example, polyetherimides and poly(phenylene ethers) are known to be sensitive to oxygen at high temperature and darken measurably when heated in the presence of oxygen. Steps which may be taken in order to minimize the concentration of oxygen in the extruder, or to minimize the exposure of the hot polymer emerging from the extruder dieface to oxygen include: wrapping external parts of the extruder with cladding and supplying the cladding with a positive pressure of nitrogen, enclosing with a housing supplied with a positive pressure of inert gas those sections of the extruder subject to the entry of oxygen due to the action of the vacuum vents, enclosing the entire extruder in an enclosure supplied with a positive pressure of nitrogen, and the like. Additionally, steps may be taken to degas the polymer-solvent mixture prior to its introduction into the extruder. Degassing may be effected in a variety of ways, for example sparging the polymer-solvent mixture with an inert gas and thereafter maintaining a positive pressure of an inert gas in the vessel holding the polymer-solvent mixture.

The polymer product produced may be used for a variety of applications and articles. For example, a polymer product comprising a blend of poly(arylene ether) and poly(alkenyl aromatic) may be used to prepare articles including computers and business equipment, automotive, electrical insulation, telecommunications, electronics, and data storage media, such as the disk substrate for compact disks, digital versatile disks, and digital video recorder applications (e.g. "Blu-Ray Disc").

EXAMPLES 1 AND 2

The following examples are set forth to provide those of ordinary skill in the art with a detailed description of how the methods claimed herein are carried out and evaluated, and are not intended to limit the scope of what the inventors regard as their invention.

Throughout the Examples, the system used to effect polymer-solvent separation comprised a co-rotating, intermeshing (i.e., self wiping) twin-screw extruder. Vent inserts, available from the Werner & Pfleiderer Company, were used in the systems of the Examples. Vent inserts differ in the cross sectional area available for the solvent vapors to escape the extruder: Type A inserts are the most restrictive (smallest cross section) and Type C are the most open (largest cross section). The cracking pressure of the pressure release valve was electronically controlled such that a steady stream of the superheated polymer-solvent mixture was introduced into the extruder.

The data in Table 1 illustrate the effectiveness of the method for separating a polymer from a large amount of solvent in a single step and providing a polymeric material, which is substantially free of solvent.

Example 1 was prepared to illustrate the isolation of a polyphenylene ether-polystyrene blend from ortho-dichlorobenzene (ODCB). A 40/60 by weight blend of polyphenylene ether (PPO, 0.33 IV PPO powder available from General Electric) and polystyrene (xPS, L3050 available from Chevron Phillips Chemical) was prepared according to the following procedure. To a pre-heated (about 125° C.), nitrogen blanketed, stirred amount of reagent-grade ODCB solvent was added 160 pounds (72.6 kilograms (kg)) of PPO powder and 240 pounds (108.9 kg) of xPS, to make a solution containing 20 percent by weight solids. The solution was heated to about 170° C. and gravity filtered through a 5-micrometer size filter bag.

After the filtration step was completed, a portion of the ODCB was removed by distillation to pre-concentrate the 20 percent by weight solution to a polymer-solvent mixture containing about 40 percent by weight solids. The polymer-solvent mixture was charged to a feed tank where the temperature of the polymer-solvent mixture at the feed tank was about 160° C., and the pressure was about 80 psig (5.6 kilogram-force per square centimeter (kgf/cm²)) under nitrogen. A gear pump was used to transfer the polymer-solvent mixture at a rate of about 72 pounds of solution per hour (32.7 kg/hour) to a shell-and-tube heat exchanger maintained at about 310° C. (590° F.). Nitrogen was used to provide enough pressure (about 80 psig, 5.6 kgf/cm²) to feed the pump head of the gear pump.

The polymer-solvent mixture emerged from the heat exchanger at about 270–280° C. and was fed through a combination of two sintered-metal filters (PALL, 13-micrometer size pleated filters, surface area of about 1.5 foot per filter (0.14 square meter)) to remove contaminates and particulates within the feed solution. The temperature of the filter housings was maintained at about 280° C.

The filtered polymer-solvent mixture was fed through a pressure control flash valve plumbed into the downstream edge of barrel 2 of a 10 barrel, 25 mm diameter, twin-screw, co-rotating intermeshing extruder having a L/D ratio of about 40. The temperature of the solution at the pressure-controlled flash valve was about 280–285° C. The extruder was operated at a screw speed of about 575 rpm and at about 20 percent drive torque. The measured extruder barrel temperatures were 321, 299, 318, 291, 290, 290, 289, and 290° C. (die). The extruder was equipped with a closed chamber upstream of barrel 1, the closed chamber having a nitrogen line adapted for the controlled introduction of nitrogen gas before and during the solvent removal process. The extruder was further equipped at barrel 2 with a side feeder positioned orthogonal to the barrel of the extruder. The side feeder was not heated, had a L/D of about 10, and comprised two screws consisting of forward conveying elements only. At the end most distant from the extruder barrel, the side feeder was equipped with a single atmospheric vent (vent 1). The conveying elements of the screws of the side feeder were configured to convey toward the extruder and away from the side feeder vent. The extruder was further equipped with two additional atmospheric vents at barrel 1 (vent 2), and barrel 4 (vent 3), and three vacuum vents (vents operated at subatmospheric pressure) at barrel 5 (vent 4), barrel 7 (vent 5) and barrel 9 (vent 6). The three atmospheric vents, two on the extruder and one on the side feeder, were each connected to a solvent removal and recovery manifold comprising solvent vapor removal lines, a condenser and liquid solvent receiving vessel. The vacuum vents were similarly adapted for solvent recovery. Vents 3, 4, 5 and 6 were equipped with Type C inserts. Vents 1 and 2 were not equipped with a vent insert.

The extruder screw elements consisted of both conveying elements and kneading elements. All of the conveying elements in both the extruder and the side feeder were forward flighted conveying elements. Kneading elements used included neutral, forward flighted and rearward flighted kneading elements depending on function. In barrels 2 and 3 of the extruder, kneading blocks consisting of forward and neutral flighted kneading elements were employed. The extruder screws were equipped with melt seals consisting of kneading blocks made up of rearward flighted kneading elements. The melt seals were located at barrels 5, and 8. The vacuum vents were located downstream of the melt seals on barrel 5, barrel 7 and barrel 9, and were operated at vacuum levels of about 28 inches of mercury (711 millimeters Hg) (a vacuum gauge indicating full vacuum, or zero absolute pressure, would read about 30 inches of mercury (762 millimeters Hg).

Shell-and-tube heat exchangers were used as condensers to recover the ODCB solvent removed in the process. A slight vacuum (about 1 inch Hg (25 millimeters Hg)) was applied to the heat exchanger receiving solvent vapor from the atmospheric vents to evacuate the solvent vapors. The devolatilized PPO-xPS resin which emerged from the die face (melt temperature about 310° C.) of the extruder was stranded and pelletized.

About 1000 pounds (453.6 kg) of polymer-solvent mixture containing about 40 percent by weight of solids were prepared, filtered and isolated for this trial and resulted in approximately 400 pounds (181 kg) of pelletized PPO-xPS. The process was run for about 12 hours with no interruption. Prior to the run, the extruder was thoroughly cleaned by submitting the screws, vent port adaptors, vent inserts, die head/plate to an 454° C. sand-bath, and the extruder barrels were brushed prior to reassembly. The vacuum vents ran clean throughout the run, as determined by visual inspection at least every 15 minutes during the 12-hour long run. Only one filter housing was used for the entire 12-hour experiment. The differential pressure across the filter was constant throughout the run. Table 1 provides the processing data for Example 1. The residual ODCB is provided as an average of two test runs based on the same sample. "T of Solution at Feed Tank (° C.) indicates the temperature of the polymer-solvent mixture in the feed tank. "T Feed after Heat Exch. (° C.)" indicates the temperature of the polymer-solvent mixture after passage through the heat exchanger. "T feed at the P-valve (° C.)" indicates the temperature of the polymer-solvent mixture at the pressure control valve. "T Heating Oil for Heat Exchanger" indicates the temperature of the oil for the heat exchanger. "residual ODCB by GC (ppm)" provides the amount of residual ODCB in parts per million (ppm) remaining in the devolatilized polymer following pelletization and was determined by gas chromatography.

Example 2 was prepared similarly to Example 1, with some modifications. A 10 percent by weight solids solution of PPO-xPS was prepared by combining 26.7 pounds (12.1 kg) of 0.33 IV PPO powder and 40 pounds (18.1 kg) of L3050 grade xPS with ODCB. The resulting 10 percent by weight solids solution was heated to about 170° C. and gravity filtered through a 5-micrometer size filter bag. The filtrate was concentrated to about a 40 percent by weight solids solution by removal of ODCB by distillation.

The solution was not superheated in a shell-and-tube heater and was not filtered through a combination of two sintered-metal filters prior to isolation of the polymeric material from the solvent. Isolation of the polymeric material was performed in a 25 mm-diameter twin-screw, co-rotating intermeshing extruder having 10 barrels (L/D= 40); a 2-hole die plate; and six vents, two of which were located upstream of the feed port and operated at atmospheric pressure, and the other four vents were located downstream of the feed port and operated at relatively high levels of vacuum (about 28 inches of mercury (711 millimeters Hg)). The atmospheric vents 1 and 2 were located at extruder barrel 1 and on a side feeder connected to barrel 2 of the extruder, respectively. The feed solution was added directly to the extruder at an injection port located at the downstream edge of barrel number 2. A side feeder, operated as a vent, was connected to the extruder at barrel number 2. Finally, the extruder was not cleaned prior to the run, but was purged for some time with the same solution used as the feed. Processing conditions for Example 2 can be found in Table 1. The residual ODCB is provided as an average of the results of two samples.

TABLE 1

| Example | Solution Mass Flow Rate (kg/hr) | Torque (%) | Melt (° C.) | Screw speed (rpm) | Barrel Temperatures (° C.) |
|---|---|---|---|---|---|
| 1 | 32.7 | 20 | 310 | 575 | 321/299/318/291 290/290/289/290 |
| 2 | 13.9–15.9 | 20 | 305 | 450 | 317/289/289/290/ 290/290/281/290 |

| Example | T of Solution at Feed Tank (° C.) | T feed after Heat Exch. (° C.) | T feed at the P-valve (° C.) | T Heating Oil for Heat Exchanger (° C.) | Residual ODCB by GC (ppm) |
|---|---|---|---|---|---|
| 1 | 160 | 270–280 | 280–285 | 310 | 2586 (avg. of 2 runs) |
| 2 | 162 | — | — | — | 1550 (avg. of 2 samples) |

Example 1 illustrates the application of the present method to a polymer-solvent mixture comprising polyphenylene ether and polystyrene. As shown, a relatively low weight percent solids solution comprising polyphenylene ether and polystyrene may be processed to provide isolated polyphenylene ether-polystyrene containing minor amounts of residual solvent. Example 2 illustrates another embodiment wherein the solution was not superheated. As shown in the residual solvent results, the method provided the separation of polyphenylene ether-polystyrene from ODCB in one step to provide a polymer with minor amounts of residual solvent. The larger amount of solvent in Example 1 as compared to Example 2 may be explained by a flow rate of solution through the extruder that is double from the flow rate of Example 2. Both Examples provide a method for the expedient separation of polymer from a solvent.

The invention has been described in detail with particular reference to preferred embodiments thereof, but it will be understood by those skilled in the art that variations and modifications can be effected within the spirit and scope of the invention.

All cited patents, patent applications, and other references are incorporated herein by reference in their entirety.

What is claimed is:

1. A method for separating a polymer from a solvent, comprising:
   introducing a superheated polymer-solvent mixture to an extruder, wherein the extruder comprises an upstream vent and a downstream vent;
   removing solvent from the superheated polymer-solvent mixture via the upstream vent and the downstream vent; and
   isolating a polymer product from the superheated polymer-solvent mixture;
   wherein the polymer-solvent mixture comprises a polymer and a solvent, wherein the amount of polymer in the polymer-solvent mixture is less than or equal to about 75 weight percent based on the total weight of polymer and solvent, and wherein the polymer is a poly(arylene ether).

2. The method of claim 1, wherein the polymer-solvent mixture further comprises a polyetherimide, a polycarbonate, an additional poly(arylene ether), a polyamide, a polyarylate, a polyester, a polysulfone, a polyetherketone, a polyimide, a olefin polymer, a polysiloxane, a poly(alkenyl aromatic), or a combination comprising at least one of the foregoing polymers.

3. The method of claim 1, wherein the upstream vent is operated at about 750 mm of Hg or greater or at about 750 mm of Hg or less, and wherein the downstream vent is operated at about 750 mm of Hg or less.

4. The method of claim 1, wherein about 50 to about 99 percent of the solvent present in the superheated heated polymer-solvent mixture is removed through the upstream vent.

5. The method of claim 4, wherein about 1 to about 50 percent of the solvent present in the superheated polymer-solvent mixture is removed through the downstream vent.

6. The method of claim 1, wherein the superheated polymer-solvent mixture is pressurized.

7. The method of claim 6, wherein the superheated polymer-solvent mixture has a temperature about 2° C. to about 200° C. higher than the boiling point of the solvent at atmospheric pressure.

8. The method of claim 1, wherein the extruder further comprises a side feeder, wherein the side feeder comprises a side feeder vent operated at about 750 mm of Hg or greater or at about 750 mm of Hg or less.

9. The method of claim 8, wherein the superheated polymer-solvent mixture is introduced into the side feeder via a pressure control valve connected to the side feeder.

10. The method of claim 8, wherein the side feeder further comprises a kneading block, wherein the pressure control valve is positioned between the extruder and the kneading block and the kneading block is positioned between the pressure control valve and the side feeder vent.

11. The method of claim 8, wherein the side feeder is a twin-screw side feeder having a length to diameter ratio of 20 or less.

12. The method of claim 8, wherein the side feeder is a twin-screw side feeder having a length to diameter ratio of 12 or less.

13. The method of claim 1, wherein the extruder further comprises a non-venting side feeder.

14. The method of claim 13, further comprising introducing a filler, additive, or additional polymer to the extruder via the non-venting side feeder.

15. The method of claim 1, wherein the heated superheated polymer-solvent mixture is introduced to the extruder via a feed inlet in direct communication with the extruder barrel.

16. The method of claim 15, wherein the feed inlet is a pressure control valve.

17. The method of claim 16, wherein a cracking pressure of the pressure control valve is about 0.07 kgf/cm² to about 25 kgf/cm².

18. The method of claim 15, wherein the upstream vent is positioned upstream from the feed inlet.

19. The method of claim 1, wherein the polymer product is substantially free of solvent.

20. The method of claim 1, wherein the extruder is a twin-screw counter-rotating extruder, a twin-screw co-rotating extruder, a single-screw extruder, or a single-screw reciprocating extruder.

21. The method of claim 1, wherein the extruder is operated at a temperature of about 200 to about 400 degrees centigrade.

22. The method of claim 1, wherein the extruder operation is characterized by a ratio of a feed rate in kilograms per hour to an extruder screw speed in revolutions per minute, the ratio being about 0.045 to about 45.

23. The method of claim 1, further comprising introducing the polymer product into a second extruder.

24. The method of claim 23, wherein the second extruder is a twin-screw counter-rotating extender, a twin-screw co-rotating extruder, a single-screw extruder, or a single-screw reciprocating extruder.

25. The method of claim 23, wherein the second extruder comprises a second extruder vent operated at about 750 mm of Hg or less.

26. The method of claim 1, wherein the superheated polymer-solvent mixture is heated by a heat exchanger or an extruder.

27. The method of claim 1, wherein the polymer-solvent mixture has a polymer content of about 5 to about 40 percent by weight based on the total weight of polymer and solvent.

28. The method of claim 1, wherein the solvent is a halogenated aromatic solvent a halogenated aliphatic solvent, a non-halogenated aromatic solvent, a non-halogenated aliphatic solvent, or a mixture thereof.

29. The method of claim 1, further comprising introducing nitrogen gas into the extruder.

30. The method of claim 1, further comprising filtering the polymer-solvent mixture in a solution filtration system prior to introducing the polymer-solvent mixture to the extruder.

31. The method of claim 30, wherein the solution filtration system comprises a filter having a pore size of less than about 50 micrometers.

32. The method of claim 30, wherein the solution filtration system comprises a sintered-metal filter, a cloth filter, a fiber filter, a paper filter, a pulp filter, a metal mesh filter, a ceramic filter, or a combination comprising at least one of the foregoing filters.

33. The method of claim 1, wherein the extruder comprises a melt filtration system.

34. The method of claim 33, wherein the melt filtration system comprises a sintered metal filter, a metal mesh filter, or a combination thereof.

35. The method of claim 1, wherein the polymer-solvent mixture comprises a product feed stream from a reaction vessel.

36. The method of claim 1, wherein the poly(arylene ether) comprises a plurality of structural units of the structure

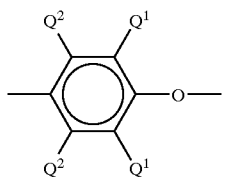

wherein for each structural unit, each $Q^1$ is independently halogen, primary or secondary $C_1$–$C_7$ alkyl, phenyl, haloalkyl, aminoalkyl, hydrocarbonoxy, halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy, or halohydrocarbonoxy wherein at least two carbon atoms separate the halogen and oxygen atoms.

37. The method of claim 1, wherein the poly(arylene ether) has an intrinsic viscosity of about 0.1 to about 0.6 deciliters per gram as measured in chloroform at 25° C.

38. The method of claim 1, wherein the polymer product further comprises a poly(alkenyl aromatic) resin which contains at least 25% by weight of structural units derived from an alkenyl aromatic monomer of the formula

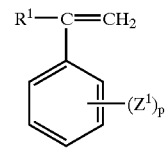

wherein $R^1$ is hydrogen, $C_1$–$C_8$ alkyl, or halogen; $Z^1$ is vinyl, halogen or $C_1$–$C_8$ alkyl; and p is 0 to 5.

39. The method of claim 38, wherein the poly(alkenyl aromatic) resin is polystyrene.

40. The method of claim 38, wherein the polymer product comprises about 1 to about 99 weight percent poly(arylene other) and about 99 to about 1 weight percent poly(alkenyl aromatic) based on the total weight of the poly(arylene ether) and poly(alkenyl aromatic) resin.

41. The method of claim 38, wherein the polymer product comprises about 40 to about 60 weight percent poly(arylene ether) and about 60 to about 40 weight percent poly(alkenyl aromatic) based on the total weight of the poly(arylene ether) and poly(alkenyl aromatic) resin.

42. The method of claim 1, wherein solvent present in the superheated polymer-solvent mixture is removed through the upstream vent and the downstream vent to provide a polymer product containing less than about 3000 parts per million solvent.

43. A method for separating a polymer from a solvent, comprising:

introducing a superheated polymer-solvent mixture via a pressure control valve located on an extruder or on a side feeder attached to the extruder, wherein the extruder comprises an upstream vent and a downstream vent, wherein the side feeder comprises a side feeder vent, and wherein the pressure control valve is attached to the extruder or positioned between the extruder and the side feeder vent;

removing solvent from the superheated polymer-solvent mixture via the upstream vent, the downstream vent, and the side feeder vent; and isolating a polymer product from the polymer solvent mixture;

wherein the polymer-solvent mixture comprises a polymer and a solvent, and wherein the polymer comprises a poly(arylene ether).

44. The method of claim 43, wherein the side feeder vent and the upstream vent are operated at about 750 mm of Hg or greater or at about 750 mm of Hg or less, and wherein the downstream vent is operated at about 750 mm of Hg or less.

45. The method of claim 43, wherein the side feeder comprising the pressure control valve further comprises a kneading block, wherein the pressure control valve is positioned between the extruder and the kneading block and the kneading block is positioned between the pressure control valve and the side feeder vent.

46. The method of claim 43, further comprising filtering the polymer-solvent mixture prior to introducing the polymer-solvent mixture to the extruder.

47. The method of claim 43, wherein the polymer product further comprises a poly(alkenyl aromatic) resin.

* * * * *

UNITED STATES PATENT AND TRADEMARK OFFICE
CERTIFICATE OF CORRECTION

PATENT NO. : 6,924,350 B2
APPLICATION NO. : 10/648542
DATED : August 2, 2005
INVENTOR(S) : Dong et al.

It is certified that error appears in the above-identified patent and that said Letters Patent is hereby corrected as shown below:

Column 1:
Line 59, after "the" delete "polymer solvent" and insert therefor -- polymer-solvent --
Column 2:
Line 2, after "upstream" delete "vents" and insert therefor -- vent --
Line 43, after "being" delete "feed" and insert therefor -- fed --
Column 3:
Line 51, after "1" delete "pounds" and insert therefor -- pound --
Column 6:
Line 64, after "solvent" delete "more" and insert therefor -- yet more --
Column 7:
Line 9, after "in" delete "a" and insert therefor -- an --
Column 9:
Line 23, after "instance" delete ";" and insert therefor -- , --
Column 10:
Line 23, after "$C_{1-4}$" delete "alky" and insert therefor -- alkyl --
Column 13:
Line 27, before "of" delete "down stream" and insert therefor -- downstream --
Line 37, after "polyimide," delete "a" and insert therefor -- an --
Column 14:
Line 54, after "a" delete "polymer solvent" and insert therefor -- polymer-solvent --
Column 17:
Line 12, before "per" delete "foot" and insert therefor -- ft.$^2$ --
Line 29, after "positioned" delete "orthogonal" and insert therefor -- or thogonally --

Signed and Sealed this

Nineteenth Day of February, 2008

JON W. DUDAS
*Director of the United States Patent and Trademark Office*